(12) United States Patent
Wu (10) Patent No.: US 7,720,088 B2
(45) Date of Patent: May 18, 2010

(54) METHOD FOR TIME DIVISION MULTIPLEXING DATA TRANSPORT

(75) Inventor: Xuyong Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 270 days.

(21) Appl. No.: 11/569,154

(22) PCT Filed: Apr. 28, 2006

(86) PCT No.: PCT/CN2006/000837

§ 371 (c)(1),
(2), (4) Date: May 22, 2007

(87) PCT Pub. No.: WO2006/116929

PCT Pub. Date: Nov. 9, 2006

(65) Prior Publication Data

US 2008/0069148 A1    Mar. 20, 2008

(30) Foreign Application Priority Data

Apr. 30, 2005    (CN) .................. 2005 1 0070358

(51) Int. Cl.
*H04B 7/212* (2006.01)
(52) U.S. Cl. .................. 370/442; 370/321; 370/337
(58) Field of Classification Search .................. 370/310, 370/315, 316, 319, 321, 328, 329, 336, 337, 370/345, 351, 352, 356, 431, 442, 464, 465, 370/466

See application file for complete search history.

(56) References Cited

U.S. PATENT DOCUMENTS 6,963,561 B1 * 11/2005 Lahat .................. 370/356

| 7,233,587 B2 * | 6/2007 | Pattavina et al. ............ 370/345 |
| 2002/0067721 A1 | 6/2002 | Kye .......................... 370/389 |
| 2003/0147372 A1 | 8/2003 | Pattavina et al. | |

(Continued)

FOREIGN PATENT DOCUMENTS

WO    WO 03/067794    8/2003

(Continued)

OTHER PUBLICATIONS

IEEE Standards, "Part 16: Air Interface for Fixed Broadband Wireless Access Systems," IEEE Computer Society, IEEE Microwave Theory and Technologies Society (2004).

(Continued)

*Primary Examiner*—Ricky Ngo
*Assistant Examiner*—Paul Masur (57) ABSTRACT

A method for TDM data transport is disclosed. Configure a TDM logical port in the transmitting and receiving side respectively, and create a relationship between the TDM logical port of the transmitting side and that of the receiving side. When transmitting the TDM data, map original TDM data to a package data format via the TDM logical port. Encapsulate the acquired package data and a CID into a MAC data package according to the predetermined encapsulation information. Then send the data package to the receiving side via a shared transmission channel. The receiving side MAC layer obtains the de-encapsulation information and the receiving side TDM logical port identifier according to the CID of the received data package, de-encapsulates the data package, maps the acquired data to the corresponding receiving side TDM logical port to implement high efficiency TDM data transport.

12 Claims, 4 Drawing Sheets

U.S. PATENT DOCUMENTS

| | | |
|---|---|---|
| 2003/0217190 A1 | 11/2003 | Devine et al. |
| 2004/0008718 A1 | 1/2004 | English et al. |
| 2004/0008724 A1 | 1/2004 | Devine et al. |
| 2004/0190548 A1 | 9/2004 | Harel et al. |
| 2005/0041691 A1 | 2/2005 | Laufer et al. |
| 2005/0238049 A1* | 10/2005 | Delregno .................. 370/466 |

FOREIGN PATENT DOCUMENTS

| | | |
|---|---|---|
| WO | WO 2004/059927 | 7/2004 |

OTHER PUBLICATIONS

ETSI, "Broadband Radio Access Networks (BRAN); Conformance Testing for the Data Link Control Layer (DLC); Part 2: Test Suite Structure and Test Puposes (TSS&TP) Specification," ETSI TS 102 385-s v1.1.1 (2005).

Supplementary European Search Report for Application No. 06722415.4-2416, dated Sep. 4, 2007.

International Search Report for PCT/CN2006/000837, mailed Aug. 10, 2006.

* cited by examiner

METHOD FOR TIME DIVISION MULTIPLEXING DATA TRANSPORT

FIELD OF THE TECHNOLOGY

The present invention generally relates to the communications technology, and more specifically, to a method for transporting Time Division Multiplexing (TDM) data.

BACKGROUND OF THE INVENTION

With the rapid development of the network communications technology, new technologies, typically as the packet switching, continuously emerge and develop. The conception, architecture and operating mode of conventional telecommunication networks are dramatically changing. Compared with the conventional circuit switching, due to the incomparable advantages of low cost and high-bandwidth, the packet switching technology can support not only the data traffics, but also TDM voice, data, Asynchronous Transfer Mode/Internet Protocol (ATM/IP) and images. Further, it can perform the conventional circuit switching function, such as Voice over IP (VOIP) technology, etc. Moreover, with the continuous enhancement of the quality of transmitting voice of the packet switching network, the mixture of voice traffics and data traffics, i.e. the mixture of conventional TDM-based circuit switching networks and packet switching-based packet switching data networks has become one tendency of the future network development.

Figure 1:
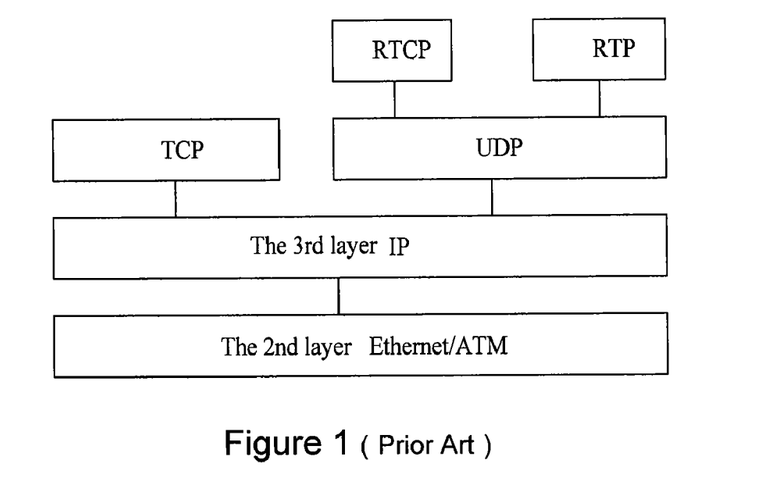
FIG. 1 is a schematic diagram illustrating the encapsulation protocol of the TDM data transport in the relevant art.

The method of packet switching-based TDM data transport in the relevant art includes the steps of: simultaneously setting up a TDM data interface and a general package data interface in a packet switching device, processing the received TDM data by using the same way as the general package data being processed, i.e. performing a layer-to-layer encapsulation on the received TDM data flow by using the mode defined in the existing protocols. The detailed encapsulated protocol layers are shown in FIG. 1, including a series of protocols with different formats such as Ethernet/ATM protocol, IP protocol, Transmission Control Protocol (TCP) or User Datagram Protocol (UDP), Real-Time Protocol (RTP) and Real-Time Control Protocol (RTCP). Encapsulated by above method, the format of the TDM traffic data may be converted to the data package format. The received data package is converged and bore in the corresponding protocol data unit for transport.

Figure 2:
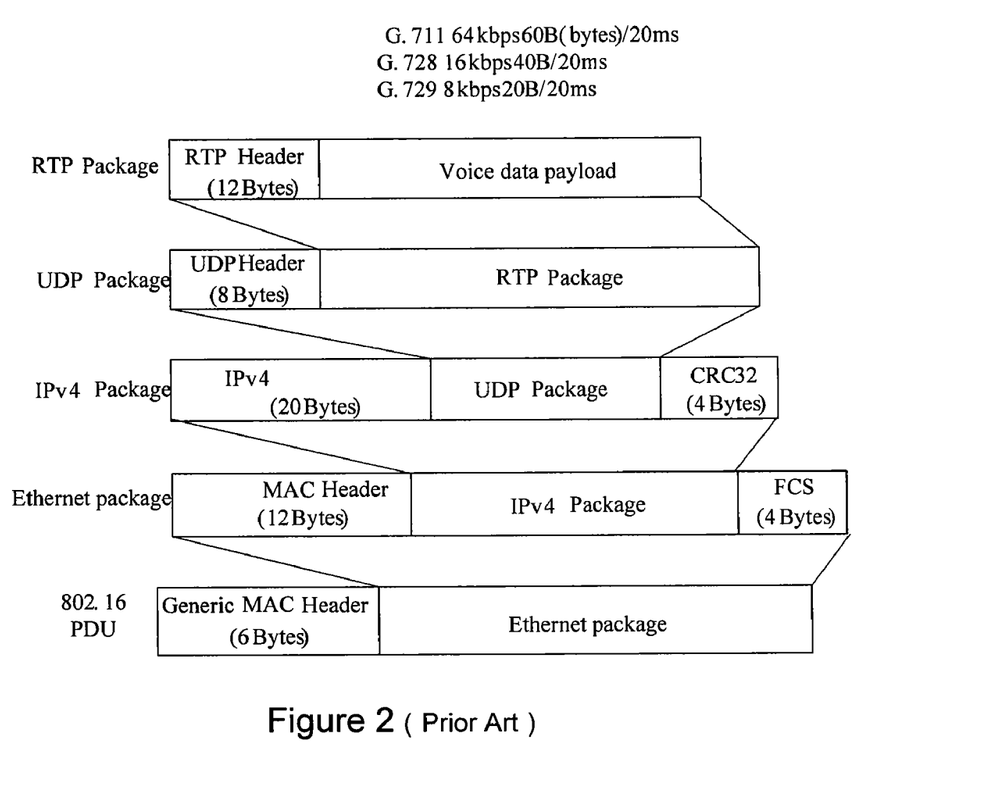
FIG. 2 is a schematic diagram illustrating the encapsulating format of the TDM data in the relevant art.

However, as the above solution is mainly proposed to solve the problem of the packet-based TDM data transport in the whole network, i.e. to solve problems such as the layer2 switching of TDM data, the network routing, the data classification on the transport layer, the real-time, etc., multilayer encapsulation is needed to be performed on the TDM data flow in accordance with the existing network protocols. With respect to the connection with shared transmission media, the problems of the port switching, the layer2 switching, and the network routing are absent. Thus the layer3 routing protocol and the real-time protocol are not needed to support the connection. Hence, if the described solution is adopted in such a case, many problems will be brought to the data transport. As the TDM data flow is encapsulated to multilayer and each layer of which is appended an encapsulating header with determined bytes, for example, as a result of which, the ratio of the data payload in the whole data package may be very low, thereby decreasing the effective bandwidth utilization and the transport efficiency. Taken the 802.16 protocol of wireless access network as an example, the Ethernet protocol is used to encapsulate the 2nd layer while the IPv4 is used to encapsulate the 3rd layer. The conventional TDM voice bandwidth is 64 Kbps, thus if one TDM data frame is sent per 20 ms, 160 bytes of TDM data is sent per 20 ms. The encapsulation of each TDM data frame is shown in FIG. 2, and the encapsulation method includes: adding an RTP header of 12 bytes to the data payload in an RTP packing, adding a (user datagram protocol) UDP header of 8 bytes in a UDP packing, adding an IPv4 header of 20 bytes in an IPv4 packing, adding a MAC header of 12 bytes in an Ethernet frame packing and adding a generic MAC header of 6 bytes when forming a 802.16 (protocol data unit) PDU. Furthermore, a check-tail of 4 bytes is appended to the above Cyclic Redundancy Check (CRC) 32 and FCS32 of the 2nd layer and the 3rd layer, respectively. The overall headers, tails and other information except for the data payload are up to 66 bytes. Thus the ratio of the data payload in the whole PDU, i.e. the effective bandwidth utilization, is only $$\frac{160}{160+66} \times 100\% \approx 70\%$$

In addition, as the solution needs to determine the adapted header format for the TDM data in each layer by table look-up and needs to perform the corresponding header adaptation, multiple times of table look-up and header edition operation are needed. The gateway devices or the corresponding processing modules are further needed and thus increasing the processing load of devices.

SUMMARY OF THE INVENTION

A method for TDM data transport is provided in an embodiment of the present invention which solves low effective bandwidth utilization existing in the current TDM data transport solution.

The method in accordance with the embodiments of this invention includes: setting up a TDM logical port in transmitting side and in receiving side respectively, creating a relationship between the TDM logical port of the transmitting side and that of the receiving side, and storing information of the relationship in the transmitting side and in the receiving side respectively. The transmitting side may map TDM data to the TDM logical port of the transmitting side, acquires encapsulation information stored in the transmitting side, encapsulates a data flow transmitted from the TDM logical port of the transmitting side and information of the relationship into a data package according to the encapsulation information, and sends the data package to the receiving side. The receiving side acquires de-encapsulation information according to the information of the relationship of the received data package, de-encapsulates the data package according to the de-encapsulation information, and maps the de-encapsulated data to the TDM logical port of the receiving side.

Preferably, the method further stores the encapsulation information and information of the TDM logical port of the transmitting side correspondingly in the transmitting side and further stores the de-encapsulation information and the information of the TDM logical port of the receiving side correspondingly in the receiving side. The process of acquiring the encapsulation information includes: acquiring the encapsulation information corresponding to the information of the TDM logical port of the transmitting side. The information of the relationship may be a TDM logical port identifier of the receiving side. The process of acquiring the de-encapsulation information according to the information of the relationship includes: inquiring the information of the TDM logical port of the receiving side corresponding to the TDM logical port identifier of the receiving side carried in the received data package, and acquiring the de-encapsulation information according to the inquired information of the TDM logical port of the receiving side.

Preferably, the method may further create a logical connection between the TDM logical port of the transmitting side and the corresponding TDM logical port of the receiving side, assigns a connection identifier (CID) to the logical connection, and stores connection information containing the CID in the transmitting side and the receiving side respectively. The transmitting side stores the encapsulation information and the connection information of the transmitting side correspondingly, and the receiving side stores the de-encapsulation information and the connection information of the receiving side correspondingly. The relationship between the TDM logical port of the transmitting side and that of the receiving side may include the relationship among the TDM logical port of the transmitting side, the TDM logical port of the receiving side and the CID. The process of acquiring the encapsulation information includes: acquiring the CID corresponding to the TDM logical port of the transmitting side according to the stored relationship, and acquiring the encapsulation information corresponding to the connection information of the corresponding transmitting side according to the CID. The information of the relationship may be the CID. The process of acquiring the encapsulation information includes: inquiring the corresponding connection information of the receiving side according to the CID carried by the received data package, and acquiring the de-encapsulation information corresponding to the connection information of the receiving side.

The process of storing the relationship in the transmitting side and the receiving side respectively may preferably include creating and storing a relationship table containing a TDM logical port identifier of the transmitting side and a TDM logical port identifier of the receiving side in the transmitting side and in the receiving side respectively.

The TDM logical port is preferably on the Media Access Control (MAC) layer. The process of encapsulating the data flow transmitted from the TDM logical port and the information of the relationship into the data package may preferably include encapsulating a generic MAC header and the data flow transmitted from the TDM logical port into a MAC package. The information of the relationship is preferably carried in the generic MAC header.

The process of mapping the TDM data to the TDM logical port of the transmitting side may preferably include extracting a configured Time Slot (TS) data determined according to information of the TDM logical port from a TDM data frame. The process of encapsulating the data flow and the information of the relationship into the data package according to the encapsulation information may preferably include fragmenting the data flow into fragments according to a fragment length defined according to the encapsulation information, extracting each fragmental data to form a payload part of the data package; adding the information of the relationship to the header, and encapsulating the payload and the header into the data package.

In the transmitting side, the fragment length is preferably an integral multiple or the reciprocal of the integral multiple of a frame timing period of a physical layer.

The method may preferably further include deciding whether the received data is a TDM data according to data source in the transmitting side. If the received data is the TDM data, the received TDM data is mapped to the TDM logical port of the transmitting side. Otherwise, a CID according to the header of the received package data is assigned, a packet adaptation process and an encapsulation edit process is performed on the received package data, and the package data is sent to the receiving side. The method may preferably further include deciding whether the received data is the TDM data according to the CID of the received data package in the receiving side. If the received data is the TDM data, acquire the de-encapsulation information and the TDM logical port identifier of the receiving side according to the information of the relationship of the received data package. Otherwise, inquire corresponding packet adaptation processing information according to the CID, perform the corresponding packet adaptation process and the de-encapsulation process on the data package, and send the data to a corresponding package interface.

The process of the transmitting side sending the data package to the receiving side may preferably include sending an integral number of fixed-length data packages within at least one physical frame timing period.

Preferably, the relationship is configured directly by a Base Station or is applied for by a terminal.

Therefore, in the embodiments of the present invention, a TDM logical port is respectively set in the transmitting side and the receiving side of the communications system which is based on the shared transmission media, and a corresponding relationship between the TDM logical port of the transmitting side and that of the receiving side is created. When sending the TDM data in the transmitting side, the format of the original TDM data is mapped to a package data format by the configured TDM logical port. The acquired package data together with a Connection Identifier (CID) are encapsulated into a MAC data package according to the preconfigured encapsulation information and then the data package is sent to the receiving side via the shared transmission media. When in the receiving side, the MAC layer requires the de-encapsulation information and the corresponding Information of the TDM logical port of the receiving side according to the CID of the received data package de-encapsulates the data package, and then maps the acquired data from the de-encapsulation to the corresponding TDM logical port of the receiving side to implement the TDM data transport.

In the present invention, in terms of connections with shared transmission media, the problems of port switching, the layer2 switching and the network routing are absent, while the layer3 routing protocols are not needed. The data classification is not needed and thus the encapsulation of transport layer protocols is not needed in the present invention, since the connection-based traffics are employed in the invention. In addition, sending or receiving the fixed data amount within a fixed time can be implemented timely and thus a real-time protocol is not needed. In this invention, what needed is only encapsulating the received TDM data and the TDM logical port identifier information indicating the data destination or the CID information, into a MAC data package, to increase the bandwidth occupancy ratio of the data payload in the whole data package and implement a high efficiency transport of the TDM data.

DETAILED DESCRIPTION OF THE INVENTION

To make the technical solutions and advantages of this invention more apparent, the invention is hereinafter described in detail with reference to the accompanying drawings.

In an embodiment of this invention, a TDM logical port is respectively set in the transmitting side and the receiving side of the communication system, and a corresponding relationship between the TDM logical port of the transmitting side and that of the receiving side is created and stored. When sending the TDM data, the original TDM data is mapped to a package data format via the TDM logical port of the transmitting side. The acquired package data and the corresponding relationship index information are encapsulated into a MAC data package according to the configured encapsulation information, and then the data package is sent to the receiving side via the shared transmission media. In the receiving side, the MAC layer obtains the de-encapsulation information and the corresponding receiving side TDM logical port information according to the corresponding relationship index information of the received data package, de-encapsulates the data package, and then maps the de-encapsulated data to the corresponding TDM logical port of the receiving side to implement the high efficiency transport of TDM data.

The solution of this invention can be adopted in all shared transmission media based communication systems, such as wireless access networks, Power Line Communication (PLC) systems, cable television network systems, etc. In a wireless access network, the shared transmission media is the space through which the radio waves propagate. The solution of this invention is mainly adaptable to the connection-based traffic without the problems of data classification and protocol encapsulations on the transport layer. In addition, the corresponding relationship index information may be any information identifying the corresponding relationship between the TDM logical port of the transmitting side and that of the receiving side, such as the CID, the receiving side TDM logical port identifier information, etc.

Both the transmitting side device and the receiving side device in accordance with the preferred embodiments of this invention are desired to have a TDM interface. The TDM interface type may be E0, T0, J0, E1, T1, J1, FE1, E3, T3, etc. As the shared transmission media based point-to-multipoint or the multipoint-to-multipoint system needs to identify the destination of the data flow for enabling the receiving side to implement the identification and reception of the data source, the transmitting side device and the receiving side device of this invention not only need to support the port mapping, i.e. the Ports Based Connection (PBC) function, but also need to consider whether the receiving side can identify the destination port of the received data. Thus, the mode of directly identifying the destination port in the transmitting side e.g. directly carrying the receiving side TDM logical port identifier when the transmitting side sending the data, or the mode of indirectly identifying the destination port in the transmitting side e.g. carrying the CID information and determining the corresponding receiving side TDM logical port according to the corresponding relationship via the CID information in the receiving side, may be adopted.

Taken the wireless access network as an example, wherein the BS is the transmitting side and the terminal is the receiving side, the solution of this invention is hereinafter described in detail. As above described, a TDM logical port needs to be configured in the BS side and the terminal side respectively; meanwhile the corresponding TDM logical port information and the corresponding relationship information of the corresponding TDM logical ports are stored in the BS side and the terminal respectively.

The information of the TDM logical port includes the TDM logical port type, the extracted time-slot information, etc. The information of the TDM logical port may be stored in an individually configured TDM logical port information table, or in a corresponding relationship table indicating the corresponding relationship between the TDM logical port and the CID. The transmitting side TDM logical port of the BS corresponds to the receiving side TDM logical port of the terminal in one-to-one way. The two logical ports mutually match in both the data format and the data transport speed.

The corresponding relationship between the transmitting side TDM logical port of the BS and the receiving side TDM logical port of the terminal may be created or configured in two modes—the BS directly configuring or the terminal dynamically applying for initiating a relationship. In terms of the mode of the BS directly configuring, the corresponding relationship between the transmitting side TDM logical port and the receiving side TDM logical port is determined in an initialization process. In terms of the mode of the terminal dynamically applying for initiating a relationship, the terminal initiates an application to the BS, and then the BS controls and sends the corresponding relationship information between the TDM logical ports towards the terminal via a management packet.

In addition, as the invention is based on connection, e.g. conforming on the 802.16 protocol, a logical connection between the transmitting side TDM logical port and the corresponding receiving side TDM logical port may be established. A CID may be assigned to the established logical connection to bind the TDM logical port with the CID. For example, the corresponding relationship between the assigned CID and the corresponding TDM logical port may be stored to guarantee the correct transmission and reception of TDM data.

With respect to the bidirectional TDM data transport, in uplink and downlink directions, either a same CID or different CIDs i.e. an uplink CID and a downlink CID may be used. The corresponding relationship between the transmitting side TDM logical port identifier and the corresponding CID may be stored in the transmitting side, while the corresponding relationship between the receiving side TDM logical port identifier and the corresponding CID may be stored in the receiving side. Optionally the complete corresponding relationship among the assigned CID, the transmitting side TDM logical port identifier and the receiving side TDM logical port identifier may be respectively stored in the transmitting side and the receiving side, and thus configuration information may be exchanged between the transmitting side and the receiving side by a higher layer control management packet to perform the corresponding configuration. The latter configuration is shown in Table and Table 2.

TABLE 1

| Uplink CID | Base station TDM logical port | Terminal TDM logical port | Other information |
|---|---|---|---|
| UCID1 | TDM logical port 1 | TDM logical port 1' | Terminal identifier, etc |
| UCID2 | TDM logical port 2 | TDM logical port 2' | Terminal identifier, etc |
| ... | ... | ... | ... |
| UCIDn | TDM logical port n | TDM logical port n' | Terminal identifier, etc |

TABLE 2

| Downlink CID | Base station TDM logical port | Terminal TDM logical port | Other information |
|---|---|---|---|
| DCID1 | TDM logical port 1 | TDM logical port 1' | Terminal identifier, etc |
| DCID2 | TDM logical port 2 | TDM logical port 2' | Terminal identifier, etc |
| ... | ... | ... | ... |
| DCIDn | TDM logical port n | TDM logical port n' | Terminal identifier, etc |

Table 1 is the TDM logical port corresponding relationship table stored in an official device e.g. a BS side device, wherein the UCID is an uplink connection identifier. Table 2 is the TDM logical port corresponding relationship table stored in a terminal device, wherein the DCID is a downlink connection identifier. Certainly, the corresponding relationship table may also include other information, such as terminal identifiers, port types, bandwidth information, traffic types, Quality of Service (QOS), etc.

In addition, the encapsulation information corresponding to the TDM logical port or the connection of the transmitting side and the de-encapsulation information corresponding to the TDM logical port or the connection of the receiving side are needed to be configured. The encapsulation information may include TDM fragment time-length, the number of TDM frames and/or combination order of the time slots, etc. When the encapsulation is TDM logical port-oriented, the encapsulation information and the corresponding information of the TDM logical port are stored correspondingly. When the encapsulation is connection-oriented, the encapsulation information and the corresponding connection information, e.g. a Connection Information table (CIB), are stored correspondingly. The description is hereinafter given respectively with respect to the above two circumstances.

When the encapsulation is TDM logical port-oriented, in the transmitting side, the above encapsulation information and the transmitting side TDM logical port information may be stored correspondingly. When the TDM data encapsulation is performed, the corresponding encapsulation information may be directly acquired according to the transmitting side TDM logical port information and then the TDM data may be encapsulated. In the receiving side, the corresponding de-encapsulation information and the receiving side TDM logical port information may be stored correspondingly. When the TDM data package is received, the corresponding de-encapsulation information may be directly acquired according to the corresponding receiving side TDM logical port information and then the received data package may be de-encapsulated.

When the encapsulation is connection-oriented, in the transmitting side, the encapsulation information and the stored connection information may be stored correspondingly. When the TDM data encapsulation is performed, the corresponding encapsulation information may be acquired according to the stored corresponding connection information or the connection identifier information, and then the TDM data may be encapsulated. In the receiving side, the corresponding de-encapsulation information and the connection information stored in the receiving side may be stored correspondingly. When the TDM data package is received, the corresponding de-encapsulation information is directly acquired according to the corresponding connection information, such as the connection identifier information, and then the received data package may be de-encapsulated.

Figure 3:
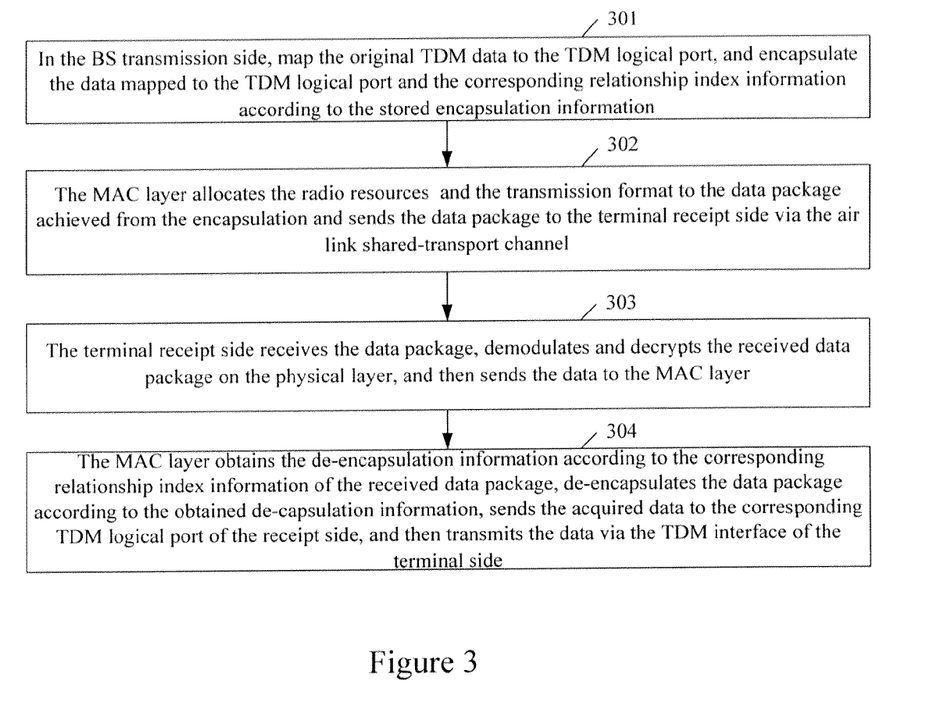
FIG. 3 is a flowchart illustrating the encapsulation process of the received TDM data according to an embodiment of this invention.

The method for TDM data transport in accordance with an embodiment of this invention is described in detail hereinafter. FIG. 3 shows the flow of the method which mainly includes the transmission processes and the receipt processes of the TDM data.

Step 301: In the BS transmitting side, the original TDM data received from the TDM interface is mapped to the configured TDM logical port and the stored encapsulation information is acquired. The data mapped to the TDM logical port and the corresponding relationship index information is encapsulated into a MAC data package according to the acquired encapsulation information.

Figure 4:
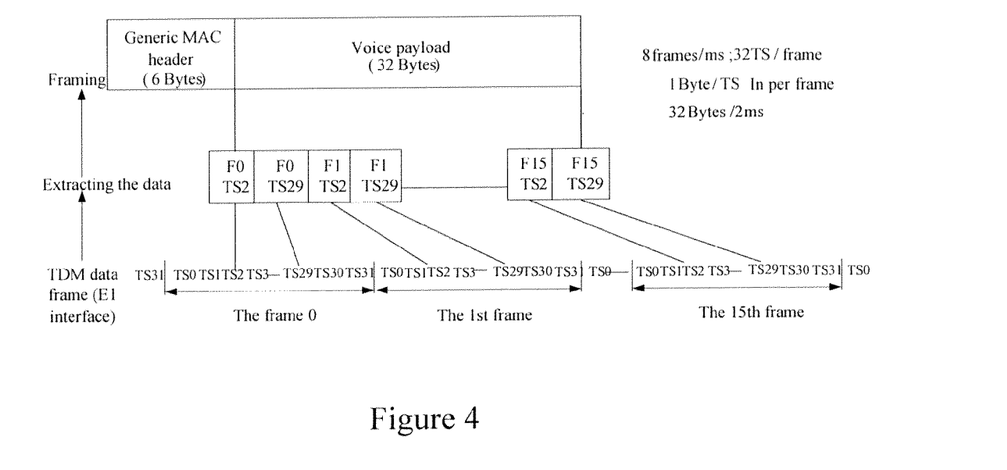
FIG. 4 is a flowchart illustrating the method according to an embodiment of this invention.

This step is described in detail with reference to an example. Assume that the TDM interface is an E1 interface, the format of the original TDM data is an E1 format. The process of mapping the original TDM data to the configured TDM logical port may be, for example as shown in FIG. 4, extracting the 2nd and 29th TS data of each TDM data frame transmitted from the E1 port and combining them to a data flow with speed of 128 Kbps.

In this step, the corresponding relationship is the corresponding relationship between the transmitting side TDM logical port and the corresponding receiving side TDM logical port. As described above, the encapsulation may be either TDM logical port-oriented or connection-oriented, and thus two ways exist for acquiring the encapsulation information.

When the encapsulation is TDM logical port-oriented, in the transmitting side, the encapsulation information and the transmitting side TDM logical port information are stored correspondingly. Thus the way of acquiring the encapsulation information is acquiring the encapsulation information corresponding to the transmitting side TDM logical port. Herein, the corresponding relationship index information in Step 301 is the TDM logical port identifier of the receiving side. Correspondingly, in the receiving side, the de-encapsulation information and the receiving side TDM logical port information are stored correspondingly. The process of acquiring the de-encapsulation information includes: inquiring the receiving side TDM logical port information corresponding to the receiving side TDM logical port identifier i.e. the corresponding relationship index information carried in the received data package, and then acquiring the de-encapsulation information according to the inquired receiving side TDM logical port information.

When the encapsulation is connection-oriented, in the transmitting side, the encapsulation information and the stored transmitting side connection information are stored correspondingly. The way of acquiring the encapsulation information is acquiring the connection information identifier i.e. the CID corresponding to the transmitting side TDM logical port and then acquiring the corresponding encapsulation information according to the CID. Herein, the corresponding relationship index information in Step 301 is the CID. In the receiving side, the de-encapsulation information and the stored receiving side connection information are stored correspondingly. The way of acquiring the de-encapsulation information is inquiring the stored de-encapsulation information in the receiving side corresponding to the CID according to the CID carried in the received data package. It should be noted that, herein, the corresponding relationship among the transmitting side TDM logical port, the receiving side TDM logical port and the CID are respectively stored in the transmitting side and the receiving side.

In addition, the process of encapsulating the data mapped to the TDM logical port is described here. Segment the data flow mapped to the corresponding TDM logical port into fragments in accordance with the predetermined encapsulation information corresponding to the TDM logical port or the connection. For example, encapsulate the 2nd and 29th TS data of every 16 consecutively transmitted TDM data frames. They may also be combined in other orders according to the configured encapsulation information and be encapsulated. The payload of the data package shown in FIG. 4 is 32 bytes. Moreover, with respect to the case of the port or the connection, the corresponding receiving side TDM logical port identifier or the corresponding connection identifier (CID) which corresponds to the corresponding TDM logical port of the transmitting side may be respectively encapsulated into data packages, for instance may be carried into the generic MAC header of the MAC data package.

Step 302: The MAC layer allocates the radio resource and the transport format to the data package acquired from the encapsulation according to the requirement of physical framing, sends the data package to the BS side physical layer, and then sends the data package to the receiving side of the terminal via the shared transmission channel of the airlink after being encrypted and modulated by the physical layer.

Figure 5:
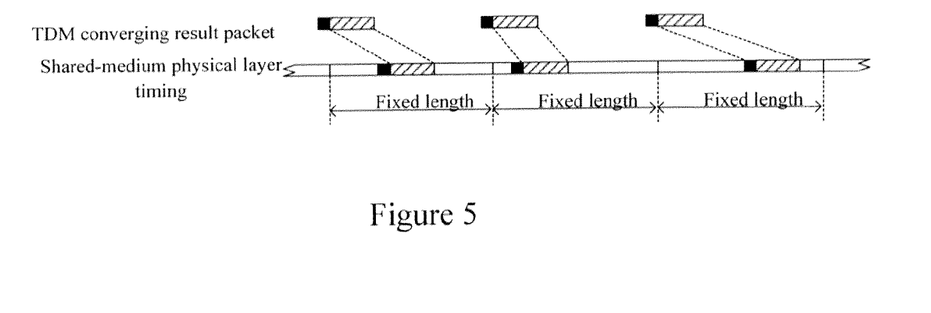
FIG. 5 is a schematic diagram illustrating the process of sending TDM fixed-length information according to the configured frame timing period.

Fixed-length timing is required in the media access control protocol or the physical layer protocol of the shared transmission media, and the data package obtained by encapsulating the TDM data is a fixed-length data package. Thus as shown in FIG. 5, one or more TDM data packages may be contained in each frame timing period, i.e. in each transmitted physical frame. In the process of encapsulating the data flow transmitted from the TDM logical port by using the predetermined fragment length in Step 301, the fragment length may be configured with respect to the frame timing period of the physical layer or the media access control layer of the shared transmission media. The fragment length may be 1/n or n multiples of the frame timing period, wherein n is a natural number, so as to implement the fixed data size reception/transmission by transmitting n or 1/n multiples of TDM data packets per frame timing period. After subsequent buffer storing and TDM re-timing, this is equal to a real time fixed rate reception/transmission. To be apparent, the frame timing period of physical layer is described briefly. Herein the physical layer refers to the physical layer of 802.16, i.e. the physical layer of the BS and the frame timing period thereof may be 2 ms, 5 ms, 1.25 ms, 20 ms, etc. The frame timing period of TDM is commonly 0.125 ms. As in the process of transmitting the TDM data, both the fragment length and the physical layer frame timing period of the BS i.e. 802.16 should be considered, the fragment length may be configured as multiples of the physical layer frame timing period of the BS i.e. 802.16, e.g. n or 1/n multiples. For example, suppose that the physical layer frame timing period of the BS is 10 ms, when an E1 is transmitted, a packet may be transmitted in a fragment length of two 5 ms (40 TDM frames). Here, the fragment length is the half of the frame timing period of the 802.16 physical layers. When a voice data is transmitted, the data in 20 ms (160 TDM frames) may be used as the fragment length and thus the fragment length is two multiples of the frame timing period of the 802.16 physical layer, that is, a packet is transmitted every two frame timing periods of the 802.16 physical layer.

Step 303: The data package is received in the terminal receiving side, demodulated and decrypted by the physical layer, and then sent to the terminal MAC layer.

Step 304: The MAC layer of the terminal receiving side obtains the de-encapsulation information according to the corresponding relationship index information of the received data package such as the receiving side TDM logical port identifier or the CID, de-encapsulates the data package according to the acquired de-capsulation information, maps the data acquired from the de-capsulation to the corresponding receiving side TDM logical port, and then sends out the data via the TDM interface of the terminal side.

As described in Step 301, the process of obtaining the de-encapsulation information according to the responding relationship index information of the received data package may be decided with respect to the different situations. When the de-encapsulation is TDM logical port-oriented, the process of acquiring the de-encapsulation information includes: inquiring the receiving side TDM logical port information corresponding to the TDM logical port identifier, i.e., the corresponding relationship index information, carried in the received data package, and then acquiring the de-encapsulation information according to the inquired receiving side TDM logical port information. When the de-encapsulation is connection-oriented, the process of acquiring the de-encapsulation information includes: inquiring the stored de-encapsulation information corresponding to the CID according to the CID carried in the received data package. Herein, the corresponding relationship among the transmitting side TDM logical port, the receiving side TDM logical port and the CID are respectively stored in the transmitting side and the receiving side.

The Step 304 will be described in detail with reference to an example. Suppose the received data package DCID value of the MAC layer of the terminal receiving side is 19. The MAC layer inquires the TDM logical port information corresponding to the DCID value of 19 from the TDM logical port corresponding relationship table stored in the terminal side. It should be noted that the corresponding relationship table is created by interacting the control management packet between the higher layer of the transmitting side and that of the receiving side. Then the MAC layer acquires the stored corresponding TDM logical port information, and maps the received data to two TDM time slots, takes 2 ms as a packet, performs a reverse process of encapsulation in Step 301, and then reverts the received data to the two voice channels, i.e., 8 frames per ms and the two TSs are processed respectively per frame. It should be noted that the receiving side need not know that the 2nd and 29th time slot of the E1 interface exist, but only needs to know the incorporate result of the two TSs. In other words, the receiving side TDM logical port type may be other types e.g. two Plain Old Telephone Traffics (POTS). Herein, the port type of TDM logical port of the transmitting side and that of the receiving side need to be recorded in the DCID information table, i.e., Table 2.

In an uplink connection, UCID may also be indicated as 19 or other numbers, the correspondence between UCID and DCID is maintained by the connection information table in the higher layer configuration, that is, a symmetrical item exists in Table 1 to correspond to the item of DCID=19 in Table 2.

In the above process, in the transmitting side of the BS, the terminal receiving side receives data by encapsulating the connection information in the data package that is constituted by encapsulating the TDM data. In addition, the invention also identifies the corresponding relationship between the TDM logical port of the transmitting side and that of the receiving side via other methods, such as via the TDM logical port information, which is not limited here.

According to the above method for transmitting TDM data, if the TDM data are transported in single voice channel for 20 ms, i.e. 64 Kbps, and the generic MAC header is 6 bytes, the ratio of the data payload occupying the whole data package is 160/166=96%. If the TDM data are transported in single voice channel for 2 ms, the ratio is: 16/22=73%. If the TDM data are transported in double voice channel shown in FIG. 4 for 2 ms, the ratio is: 32/38=84%. It can be seen that, therefore, the TDM data transmission delay by using the solution of this invention decreases 1/10 while the bandwidth occupancy rate increases.

The above process is transmitting the TDM data from the BS to the terminal and the process of transmitting TDM data from the terminal to the BS also includes two processes: the transmission process and the receipt process which are substantially the same as the above process. The main differences between the two processes are the PBC configuration of the terminal and the transmission time is under the control of the BS. Since the system supporting the 802.16 protocol is a time division system with centralized control, the time of receiving data and transmitting data by the terminals are all determined by the BS according to the current terminal registration or application situation thereby avoiding the re-transmission caused by conflictions of different terminals in the data transmission. The BS receives data from all terminals and transmits the different PBC data to the corresponding BS port.

Figure 7:
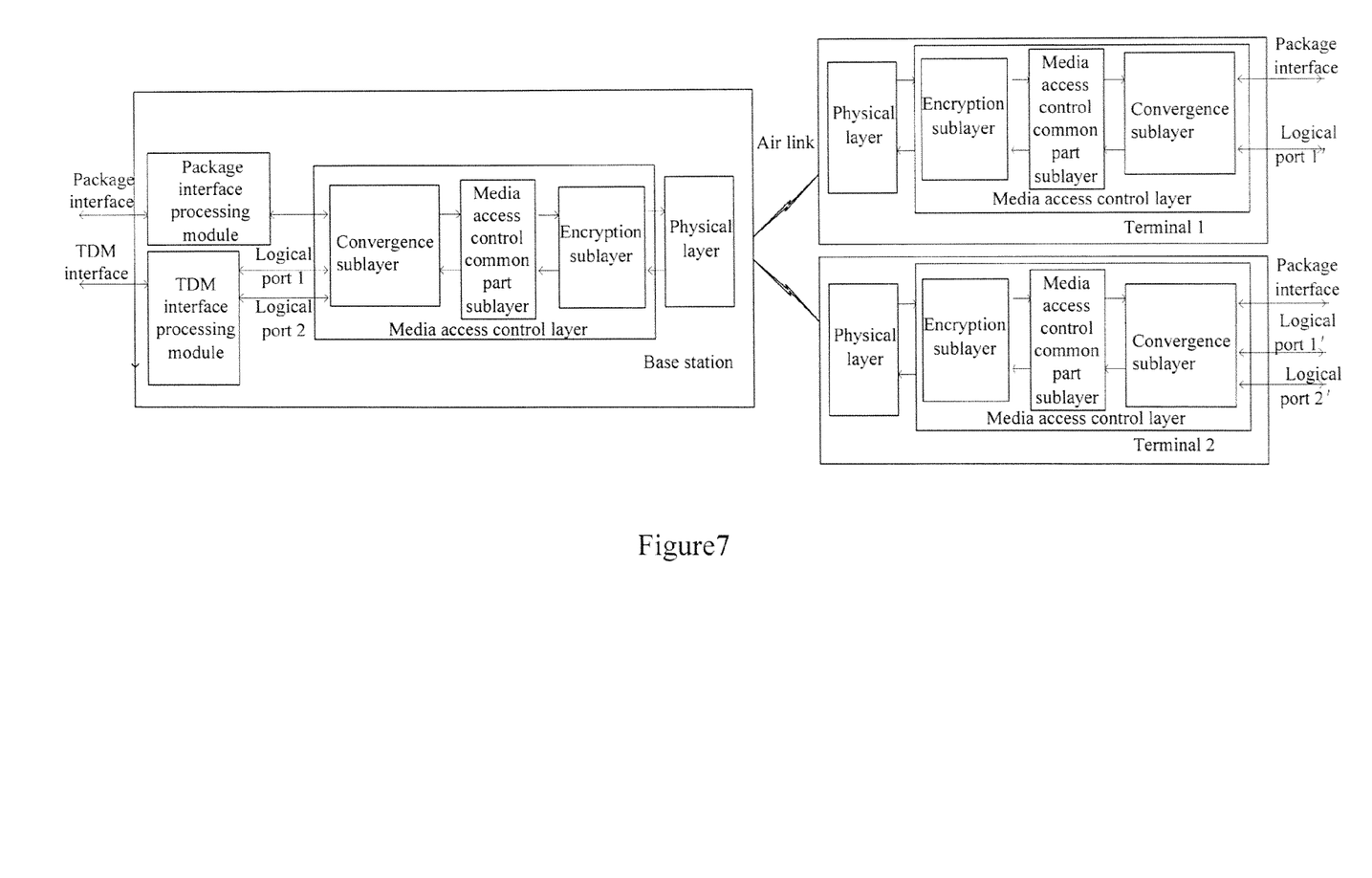
FIG. 7 is a schematic diagram illustrating the system structure of wireless access network containing a TDM interface and a package interface according another embodiment of to this invention.

The above is the process of transmitting TDM data by the official device and the terminal device. In actual applications, the TDM data and package data are transmitted in parallel to economize bandwidth resources and enhance bandwidth utilization rate. In this way, as shown in FIG. 7, two interfaces, i.e., TDM interface and package interface need to be respectively configured in the official device and the terminal device. The TDM interface is the same as that of the above embodiment, and the terminal device and the official device support the same PBC function of the above embodiment. The package interface mainly includes ATM, OC3/OC12, Ethernet FE/GE, etc. The CID assignment of package interface is usually not based on the logical port, but always based on the address information, protocol number information of transport layer, priority information, etc. Thus the traffic processing of package interface is compatible in this invention, and the method of PBC is not recommended to be used in a general traffic. However, in terms of special traffics, such as, transparent transport, private network and security, the PBC method is beneficial. Herein the device needs to simultaneously support the TDM converging method of PBC and the converging method of a general package. The device may also perform the normal traffic only supporting one of the above two converging methods. The BS is recommended to support the two and the terminal is not limited.

Figure 6:
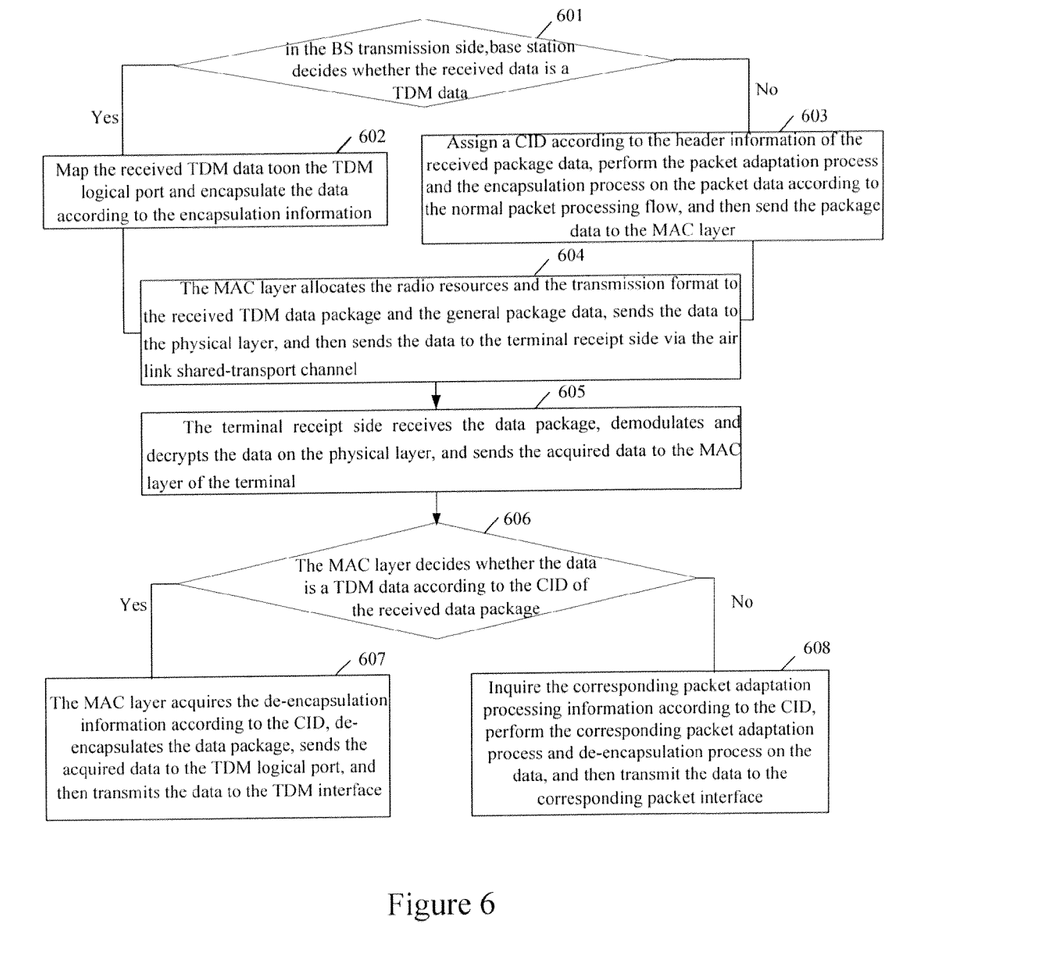
FIG. 6 is a flowchart illustrating the method according to another embodiment of this invention.

The method of this embodiment is hereinafter described by taking the process of sending the TDM data to the terminal receiving side by the BS supporting PBC as an example. For the method, same as the above embodiment, a TDM logical port needs to be respectively set in the transmitting side and the receiving side. The corresponding TDM logical port information, the corresponding relationship between the logical port and the connection information, the corresponding connection information, etc., need to be stored. The method also includes two processes: the transmission process and the reception process. The flow of the method of this embodiment is shown in FIG. 6 and includes the following steps:

Step 601: In the transmitting side of the BS, according to the interface information of the received data, decide whether the received data is TDM data. If so, perform Step 602; otherwise, perform Step 603.

Step 602: Map the received TDM data to the configured TDM logical port, encapsulate the data mapped to the TDM logical port according to the stored encapsulation information to enable it to be a MAC data package containing the data payload and the generic MAC header, and carry the CID information in the generic MAC header, and then perform Step 604.

Step 603: Assign a CID according to the header information of the received package data, perform the package adaptation process and the encapsulation edit process on the received package data according to the normal package processing flow, and then send the package data to the MAC layer.

In the above step, the normal package processing flow is the process of the package forwarding and mapping process according to the MAC address, the VLAN ID, the IP address, the TCP port number or the protocol type, etc.

Step 604: The MAC layer of the BS allocates the radio resource and the transmission format to the received TDM data package and the general package data according to requirements of physical framing, and sends the data to the physical layer. Upon the modulation on the physical layer, the data is sent to the terminal receiving side via the shared transmission channel of the airlink.

In Step 602 and Step 603, different CIDs are assigned to the TDM data and the general package data. Therefore the MAC of the BS can distinguish and process them according to the CID and CID attribute assigned to the corresponding data, thereby shielding the TDM and the package data information. In addition, in the media control common sublayer, the BS can send a work-time assignment table of each CID via the control packet in air interface.

Step 605: In the terminal receiving side, upon receiving the data signal, the terminal receiving side demodulates and decrypts the data on the physical layer and then sends the acquired data to the MAC layer.

Step 606: According to the CID of the received data, the MAC layer decides whether the data is TDM data. If so, Step 607 is performed; otherwise, Step 608 is performed.

Step 607: Inquire the corresponding TDM logical port information according to the CID, obtain the de-encapsulation information, and then de-encapsulate the received data package according to the acquired de-encapsulation information Optionally when the de-encapsulation information is stored in the connection information, inquire the corresponding connection information according to the CID, obtain the de-encapsulation information, and then de-encapsulate the data package according to the acquired de-encapsulation information. And then send the data acquired from the de-encapsulation to the corresponding TDM logical port, transmit the data via the corresponding TDM interface, and end this flow.

Step 608: Inquire the corresponding packet adaptation processing information according to the CID of the received package data, perform the corresponding package adaptation process and the de-encapsulation process on the data according to the acquired package adaptation processing information, and then transmit the data acquired from the de-encapsulation to the corresponding package interface.

The foregoing are only preferred embodiments of this invention and are not intended to limit this invention. The invention is to cover all the modifications, variations and equivalent replacements within the spirit and scope of the disclosure as defined by the appended claims.

What is claimed is:

1. A method for Time Division Multiplexing (TDM) data transport, comprising:

setting up a TDM logical port on a transmitting side and on a receiving side respectively, creating a relationship between the TDM logical port of the transmitting side and that of the receiving side, and storing information of the relationship at the transmitting side and at the receiving side respectively;

deciding whether the received data is TDM data according to data source in the transmitting side, if the received data is the TDM data, mapping the received TDM data to the TDM logical port of the transmitting side, otherwise, assigning a CID according to the header of the received package data, performing a packet adaptation process and an encapsulation edit process on the received package data, and sending the package data to the receiving side; mapping TDM data to the TDM logical port of the transmitting side, acquiring encapsulation information stored at the transmitting side, encapsulating a TDM data flow transmitted from the TDM logical port of the transmitting side and the information of the relationship into a data package according to the encapsulation information, and then sending the data package to the receiving side; and deciding whether the received data is the TDM data according to the CID of the received data package in the receiving side, if the received data is the TDM data, acquiring the de-encapsulation information and the TDM logical port identifier of the receiving side according to the information of the relationship of the received data package; otherwise, inquiring corresponding packet adaptation processing information according to the CID, performing the corresponding packet adaptation process and the de-encapsulation process on the data package, and sending the data to a corresponding package interface; acquiring de-encapsulation information according to the information of the relationship of the received data package at the receiving side, de-encapsulating the data package according to the de-encapsulation information, and mapping the de-encapsulated TDM data to the TDM logical port of the receiving side.

2. The method according to claim 1, further comprising:

storing the encapsulation information and information of the TDM logical port of the transmitting side correspondingly in the transmitting side, and storing the de-encapsulation information and the information of the TDM logical port of the receiving side correspondingly in the receiving side; wherein acquiring the encapsulation information comprises: acquiring the encapsulation information corresponding to the information of the TDM logical port of the transmitting side; and the information of the relationship comprises a TDM logical port identifier of the receiving side; and acquiring the dc-encapsulation information according to the information of the relationship comprises: inquiring the information of the TDM logical port of the receiving side corresponding to the TDM logical port identifier of the receiving side carried in the received data package, and acquiring the dc-encapsulation information according to the inquired information of the TDM logical port of the receiving side.

3. The method according to claim 1, further comprising:

creating a logical connection between the TDM logical port of the transmitting side and the corresponding TDM logical port of the receiving side, assigning a connection identifier (CID) to the logical connection, and storing connection information containing the CID in the transmitting side and the receiving side respectively; storing the encapsulation information and the connection information of the transmitting side correspondingly in the transmitting side, and storing the de-encapsulation information and the connection information of the receiving side correspondingly in the receiving side; wherein the relationship between the TDM logical port of the transmitting side and that of the receiving side comprises the relationship among the TDM logical port of the transmitting side, the TDM logical port of the receiving side and the CID;

acquiring the encapsulation information comprises: acquiring the CID corresponding to the TDM logical port of the transmitting side according to the stored relationship, acquiring the encapsulation information corresponding to the connection information of the corresponding transmitting side according to the CID; the information of the relationship comprises the CID; and acquiring the encapsulation information comprises: inquiring the corresponding connection information of the receiving side according to the CID carried by the received data package, and acquiring the de-encapsulation information corresponding to the connection information of the receiving side.

4. The method according to claim 1, wherein storing the relationship in the transmitting side and the receiving side respectively comprises:

creating and storing a relationship table containing a TDM logical port identifier of the transmitting side and a TDM logical port identifier of the receiving side in the transmitting side and in the receiving side respectively.

5. The method according to claim 1, wherein the TDM logical port is on the Media Access Control (MAC) layer; and encapsulating the TDM data flow transmitted from the TDM logical port and the information of the relationship into the data package comprises:

encapsulating a generic MAC header and the TDM data flow transmitted from the TDM logical port into a MAC package, wherein the information of the relationship is carried in the generic MAC header.

6. The method according to claim 1, wherein mapping the TDM data to the TDM logical port of the transmitting side comprises:

extracting a configured Time Slot (TS) data determined according to information of the TDM logical port from a TDM data frame; and encapsulating the TDM data flow and the information of the relationship into the data package according to the encapsulation information comprises:

fragmenting the TDM data flow into fragments according to a fragment length defined according to the encapsulation information, extracting each fragmental data to form a payload part of the data package; adding the information of the relationship to the header, and encapsulating the payload and the header into the data package.

7. The method according to claim 6, wherein, in the transmitting side, the fragment length is an integral multiple or the reciprocal of the integral multiple of a frame timing period of a physical layer.

8. The method according to claim 1, wherein the transmitting side sending the data package to the receiving side comprises:
  sending an integral number of fixed-length data packages within at least one physical frame timing period.

9. The method according to claim 1, wherein creating the relationship between the TDM logical port of the transmitting side and that of the receiving side comprises one of:
  configuring the relationship directly by a Base Station; and
  applying for the relationship by a terminal.

10. A system for Time Division Multiplexing (TDM) data transport, comprising:
  a transmitting side storing information of a relationship between the TDM logical port of the transmitting side and that of a receiving side, for mapping a received TDM data to the TDM logical port of the transmitting side, acquiring encapsulation information stored in the transmitting side, encapsulating a TDM data flow transmitted from the TDM logical port of the transmitting side and the information of the relationship into a data package according to the encapsulation information, and sending the data package to the receiving side; and
  the receiving side storing the relationship between the TDM logical port of the transmitting side and that of the receiving side, for acquiring de-encapsulation information according to the information of the relationship in the received data package, de-encapsulating the data package according to the de-encapsulation information, and mapping the de-encapsulated TDM data to the TDM logical port of the receiving side;
  the transmitting side is further used for deciding whether the received data is the TDM data according to data source, if the received data is the TDM data, mapping the received TDM data to the TDM logical port of the transmitting side; otherwise, assigning a CID according to the header of the received package data, performing a packet adaptation process and an encapsulation edit process on the received package data, and sending the package data to the receiving side; and
  the receiving side is further used for deciding whether the received data is the TDM data according to the CID of the received data package, if the received data is the TDM data, acquiring the de-encapsulation information according to the information of the relationship of the received data package; otherwise, inquiring corresponding packet adaptation processing information according to the CID, performing the corresponding packet adaptation process and the de-encapsulation process on the data package, and sending the data to a corresponding package interface.

11. A transmitting entity for Time Division Multiplexing (TDM) data transport, comprising:
  a TDM logical port of a transmitting side;
  a TDM interface processing module, for receiving TDM data and mapping the TDM data to the TDM logical port of the transmitting side;
  a medium access control, for receiving a data flow transmitted from the TDM logical port of transmitting side, acquiring encapsulation information stored in the transmitting entity, encapsulating the data flow and stored information of a relationship between the TDM logical port of transmitting side and a TDM logical port of a receiving side into a data package according to the encapsulation information, and sending out the data package;
  the transmitting side deciding whether the received data is the TDM data according to data source, if the received data is the TDM data, mapping the received TDM data to the TDM logical port of the transmitting side; otherwise, assigning a CID according to the header of the received package data, performing a packet adaptation process and an encapsulation edit process on the received package data, and sending the package data to the receiving side; and
  the receiving side deciding whether the received data is the TDM data according to the CID of the received data package, if the received data is the TDM data, acquiring the de-encapsulation information according to the information of the relationship of the received data package; otherwise, inquiring corresponding packet adaptation processing information according to the CID, performing the corresponding packet adaptation process and the de-encapsulation process on the data package, and sending the data to a corresponding package interface.

12. The transmitting entity according to claim 11, further comprising a package interface processing module, for receiving a package data and sending the package data to the medium access control functionality of the transmitting entity.

* * * * *